(12) United States Patent
Goto et al.

(10) Patent No.: US 12,172,642 B2
(45) Date of Patent: Dec. 24, 2024

(54) BRAKING CONTROL APPARATUS FOR HYBRID VEHICLE

(71) Applicant: SUBARU CORPORATION, Tokyo (JP)

(72) Inventors: Wataru Goto, Tokyo (JP); Tomonari Ando, Tokyo (JP); Pohsiu Tsai, Tokyo (JP); Daisuke Nakayama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 255 days.

(21) Appl. No.: 17/747,043

(22) Filed: May 18, 2022

(65) Prior Publication Data

US 2022/0379891 A1    Dec. 1, 2022

(30) Foreign Application Priority Data

May 28, 2021    (JP) ................................. 2021-089979

(51) Int. Cl.
*B60W 30/18*    (2012.01)
*B60L 7/26*    (2006.01)
(Continued)

(52) U.S. Cl.
CPC ......... *B60W 30/18127* (2013.01); *B60L 7/26* (2013.01); *B60T 8/92* (2013.01);
(Continued)

(58) Field of Classification Search
CPC ......... B60W 30/18127; B60W 10/184; B60W 10/196; B60W 10/198; B60W 20/50;
(Continued)

(56) References Cited

U.S. PATENT DOCUMENTS

2018/0354484 A1* 12/2018 Yamamoto ............ B60T 15/028

FOREIGN PATENT DOCUMENTS

JP    6064762 B2    1/2017

OTHER PUBLICATIONS

English Translation of JP2014208498A Author: Takeda et al. Title: Vehicle Controller Date: Nov. 6, 2014 (Year: 2014).*

(Continued)

*Primary Examiner* — James J Lee
*Assistant Examiner* — Steven Vu Nguyen
(74) *Attorney, Agent, or Firm* — Rimon P.C.

(57) ABSTRACT

A braking control apparatus includes a braking force control unit, a first abnormality detecting unit, a regenerative brake stopping unit, and a braking force compensating unit. The braking force control unit is configured to perform a braking force control by causing an engine brake, a regenerative brake, and a friction brake to operate in cooperation with each other. The regenerative brake stopping unit is configured to disconnect the regenerative brake from the braking force control, when an abnormality of the regenerative brake is detected by the first abnormality detecting unit. The braking force compensating unit is configured to perform a braking force compensation that utilizes the friction brake, from the detection of the abnormality of the regenerative brake until the regenerative brake is disconnected from the braking force control, by performing a feedback control on a deceleration rate at a time when the abnormality of the regenerative brake is detected.

4 Claims, 6 Drawing Sheets

(51) Int. Cl.
  *B60T 8/92* (2006.01)
  *B60T 13/58* (2006.01)
  *B60T 17/22* (2006.01)
  *B60W 10/184* (2012.01)
  *B60W 10/196* (2012.01)
  *B60W 10/198* (2012.01)
  *B60W 20/50* (2016.01)

(52) U.S. Cl.
  CPC ............ *B60T 13/586* (2013.01); *B60T 17/22* (2013.01); *B60W 10/184* (2013.01); *B60W 10/196* (2013.01); *B60W 10/198* (2013.01); *B60W 20/50* (2013.01); *B60W 30/18136* (2013.01); *B60T 2270/406* (2013.01); *B60T 2270/604* (2013.01); *B60T 2270/611* (2013.01); *B60W 2710/18* (2013.01)

(58) Field of Classification Search
  CPC ......... B60W 30/18136; B60W 2710/18; B60L 7/26; B60T 8/92; B60T 13/586; B60T 17/22; B60T 2270/406; B60T 2270/604; B60T 2270/611
  See application file for complete search history.

(56) References Cited

OTHER PUBLICATIONS

English Translation of JP 2011183961 A Author: Okano et al. Title: Brake Control Device Date: Sep. 22, 2011 (Year: 2011).*
Office Action dated Oct. 29, 2024 issued in the corresponding Japanese Patent Application No. 2021-089979, w/ English Translation.

* cited by examiner

BRAKING CONTROL APPARATUS FOR HYBRID VEHICLE

CROSS-REFERENCE TO RELATED APPLICATIONS

The present application claims priority from Japanese Patent Application No. 2021-089979 filed on May 28, 2021, the entire contents of which are hereby incorporated by reference.

BACKGROUND

The technology relates to a braking control apparatus for a hybrid vehicle.

A vehicle such as a hybrid vehicle includes a braking control apparatus that uses a friction brake and a regenerative brake in combination to achieve a desired braking force. The friction brake generates a braking force at a wheel by operating a friction engagement member by means of a pressure such as a hydraulic pressure. The regenerative brake generates the braking force at the wheel by activating a motor generator as an electrical generator.

For example, Japanese Patent (JP-B) No. 6064762 discloses a technique that stabilizes a vehicle behavior in a case where an abnormality occurs in the regenerative brake of the braking control apparatus, or a vehicle control apparatus, for the hybrid vehicle. The technique disclosed in JP-B No. 6064762 performs the following operation when the abnormality of the regenerative brake is detected, in a case where a difference between a target behavior of the vehicle, calculated on the basis of an operation amount of a brake pedal or an operation amount of an accelerator pedal, and a deceleration rate detected by an accelerometer exceeds a predetermined range. Namely, a torque to be generated at the vehicle as a whole is distributed to normal devices other than the abnormal regenerative brake, i.e., to the friction brake, an engine, and a transmission to cover a torque decreased by the abnormal regenerative brake and thereby to achieve the target behavior, until the motor generator is electrically disconnected from the vehicle.

SUMMARY

An aspect of the technology provides a braking control apparatus for a hybrid vehicle. The hybrid vehicle includes a power unit, an engine, and a motor generator. The engine and the motor generator serve as drive sources of the power unit. The braking control apparatus includes a braking force control unit, a first abnormality detecting unit, a regenerative brake stopping unit, and a braking force compensating unit. The braking force control unit is configured to perform a braking force control by causing an engine brake that is based on the engine, a regenerative brake that is based on the motor generator, and a friction brake that is based on a friction engagement member to operate in cooperation with each other. The first abnormality detecting unit is configured to detect an abnormality of the regenerative brake. The regenerative brake stopping unit is configured to disconnect the regenerative brake from the braking force control and stop an activation of the regenerative brake, in a case where the abnormality of the regenerative brake is detected by the first abnormality detecting unit. The braking force compensating unit is configured to perform a braking force compensation that utilizes the friction brake, during a time period from when the detection of the abnormality of the regenerative brake is detected by the first abnormality detecting unit to when the regenerative brake is disconnected from the braking force control by the regenerative brake stopping unit. The braking force compensating unit is configured to perform the braking force compensation by performing a feedback control on a deceleration rate at a time when the abnormality of the regenerative brake is detected by the first abnormality detecting unit.

An aspect of the technology provides a braking control apparatus for a hybrid vehicle. The hybrid vehicle includes a power unit, an engine, and a motor generator. The engine and the motor generator serve as drive sources of the power unit. The braking control apparatus includes circuitry configured to perform a braking force control by causing an engine brake that is based on the engine, a regenerative brake that is based on the motor generator, and a friction brake that is based on a friction engagement member to operate in cooperation with each other, detect an abnormality of the regenerative brake, disconnect the regenerative brake from the braking force control and stop an activation of the regenerative brake, in a case where the abnormality of the regenerative brake is detected, and perform a braking force compensation that utilizes the friction brake, during a time period from when the abnormality of the regenerative brake is detected to when the regenerative brake is disconnected from the braking force control, by performing a feedback control on a deceleration rate at a time when the abnormality of the regenerative brake is detected.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
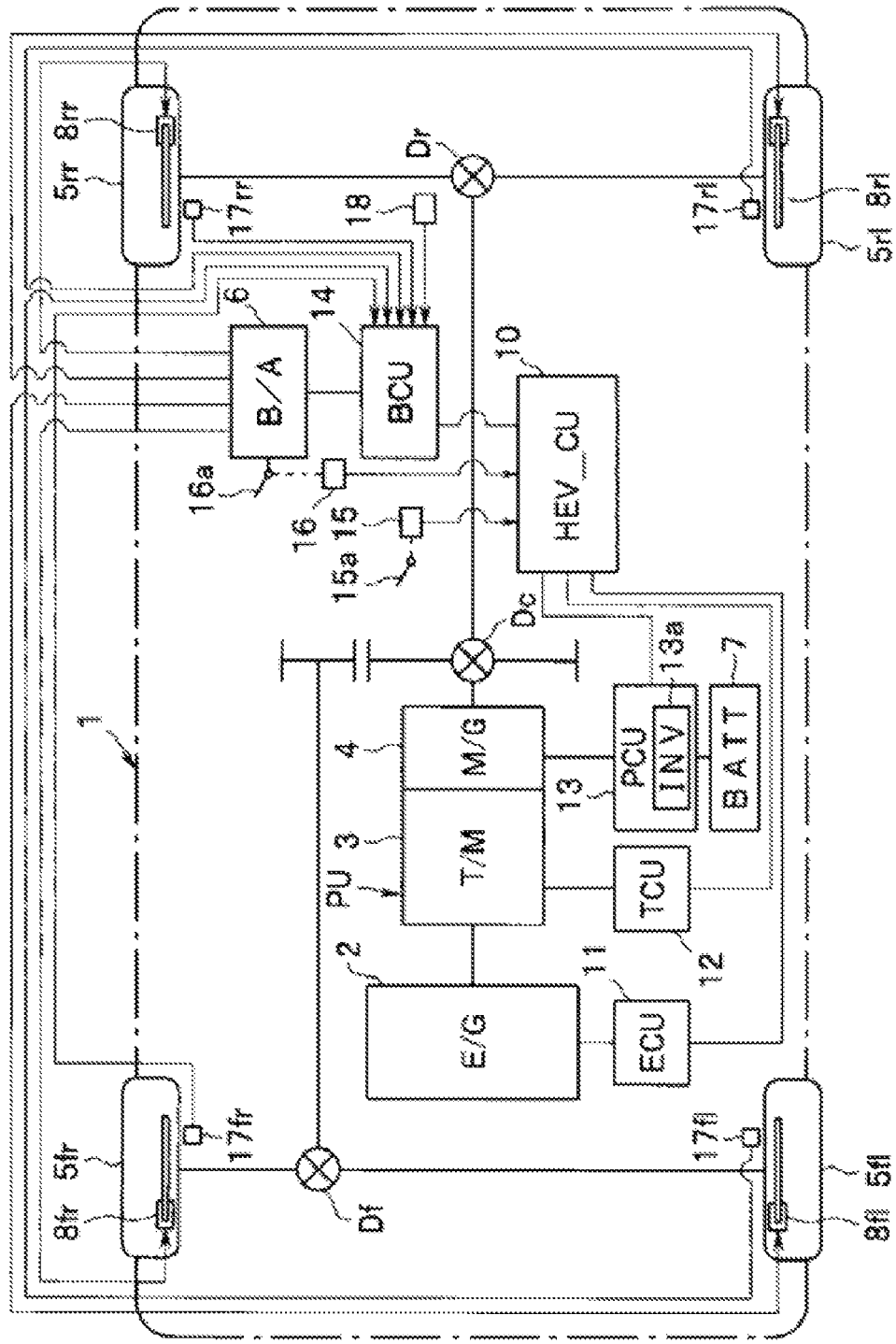
FIG. 1 is a diagram schematically illustrating a configuration of a hybrid vehicle to which a braking control apparatus for the hybrid vehicle according to one example embodiment is applied.

A technique disclosed in JP-B No. 6064762 can no longer able to perform appropriate braking in a case where complex abnormalities are occurred. For example, it is not possible to perform the appropriate braking in a case where an abnormality occurs in various sensors in addition to cutoff of a regenerative brake.

It is desirable to provide a braking control apparatus for a hybrid vehicle which makes it possible to perform appropriate braking even in a case where complex abnormalities are occurred upon a braking control.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Referring to FIG. 1, a vehicle 1 is a hybrid vehicle that includes a power unit PU. The power unit PU may include an engine 2 and a motor generator (M/G) 4 that is coupled to an output shaft of the engine 2 via an automatic transmission (T/M) 3.

The vehicle 1 illustrated in FIG. 1 according to an example embodiment may be a four-wheel drive. The output shaft of the automatic transmission 3 may be coupled to a left front wheel 5fl, a right front wheel 5fr, a left rear wheel 5rl, and a right rear wheel 5rr (hereinafter collectively referred to as "wheels 5"). The wheels 5 may be provided with wheel cylinders 8fl, 8fr, 8rl, and 8rr (hereinafter collectively referred to as "wheel cylinders 8") each having a friction engagement member such as a disc brake. The vehicle 1 illustrated in FIG. 1 may also include a center differential device Dc, a front differential device Df, and a rear differential device Dr.

The vehicle 1 may include a control system that performs a traveling control. The control system may include: a hybrid control unit (HEV_CU) 10; an engine control unit (ECU) 11; a transmission control unit (TCU) 12; a power control unit (PCU) 13 that includes an inverter (INV) 13a; and a brake control unit (BCU) 14. The hybrid control unit 10, the engine control unit 11, the transmission control unit 12, the power control unit 13, and the brake control unit 14 may be so coupled to each other as to communicate with each other via an in-vehicle network such as controller area network (CAN).

The hybrid control unit 10 may be coupled to various sensors including, for example, an accelerator sensor 15 and a brake sensor 16. The accelerator sensor 15 may be coupled to an input side of the hybrid control unit 10, and may detect a state of operation of an accelerator pedal 15a performed by a driver. In one embodiment, the accelerator sensor 15 may serve as an "accelerator operation detector". The brake sensor 16 may be coupled to the input side of the hybrid control unit 10, and may detect a state of brake operation of a brake pedal 16a performed by the driver. In one embodiment, the brake sensor 16 may serve as a "brake operation detector".

The accelerator sensor 15 may detect factors including, for example, a speed of operation performed on the accelerator pedal 15a and a fully-released state or a fully-pressed state of the accelerator pedal 15a. The brake sensor 16 may detect factors including, for example, a speed of operation performed on the brake pedal 16a and a fully-released state or a fully-pressed state of the brake pedal 16a.

The hybrid control unit 10 may calculate, for example, a request torque requested for the engine 2 and the motor generator 4 on the basis of signals supplied from the various sensors, and may perform a comprehensive drive control of the engine 2 and the motor generator 4.

The hybrid control unit 10 may also perform a switching control of a traveling mode by controlling various unillustrated clutches provided in the automatic transmission 4. In an example embodiment, the hybrid control unit 10 may switch the traveling mode to any of an EG mode in which the vehicle 1 travels solely by the engine 2, an HEV mode in which the vehicle 1 travels by a combined use of the engine 2 and the motor generator 4, and an EV mode in which the vehicle 1 travels solely by the motor generator 4.

The hybrid control unit 10 performs, for example, a braking force control on the basis of an engine brake that utilizes the engine 2, a regenerative brake that is based on the motor generator 4, a friction brake that is based on activation of respective wheel cylinders 8, or a cooperative operation thereof.

The hybrid control unit 10 may acquire a target deceleration rate upon performing the braking force control. For example, upon coast traveling, the hybrid control unit 10 may calculate the target deceleration rate on the basis of a signal (e.g., an accelerator position) supplied from the accelerator sensor 15. The hybrid control unit 10 may calculate the target deceleration rate on the basis of signals received from devices including, for example, later-described first and second brake fluid pressure sensors 59a and 59b, in a case where pressing of the brake pedal 16a performed by the driver is detected on the basis of a signal supplied from the brake sensor 16. The hybrid control unit 10 may acquire the target acceleration rate to be used for, for example, an automatic brake control calculated by an unillustrated driving assist device, in a case where the vehicle 1 is mounted with the driving assist device.

The hybrid control unit 10 may calculate a necessary brake torque on the basis of the acquired target deceleration rate, for example. Further, the hybrid control unit 10 may calculate respective distribution values on the basis of a factor such as a traveling state of the vehicle 1, and may output control signals that are based on the calculated respective distribution values to the respective engine control unit 11, transmission control unit 12, power control unit 13, and brake control unit 14. The distribution values, i.e., an engine brake torque, a regenerative brake torque, and a friction brake torque, may be used to distribute the calculated necessary brake torque to the engine brake, the regenerative brake, and the friction brake.

The engine control unit 11 may receive control data such as the request torque from the hybrid control unit 10, and may receive detection data supplied from unillustrated various sensors including, for example, a crank angle sensor provided in the engine 2. The engine control unit 11 may drive the engine 2 by controlling a fuel injection amount, an ignition timing, and various devices including, for example, an electronically controlled throttle value, on the basis of the received pieces of data.

The transmission control unit 12 may receive control data from the hybrid control unit 10, and may receive detection data supplied from unillustrated various sensors including, for example, a shift position sensor provided on a shift lever and a vehicle speed sensor. The transmission control unit 12 may perform, for example, a hydraulic pressure control to be performed on respective elements, such as clutches, configuring the automatic transmission 3 on the basis of the received pieces of data, and may thereby control a gear ratio of the automatic transmission 3.

The transmission control unit 12 may perform a predetermined shift control upon braking in cooperation with the engine control unit 11 to thereby generate a braking force, or the engine brake torque, that is based on the engine brake.

The power control unit 13 may receive control data such as the request torque from the hybrid control unit 10, and may acquire, from the inverter 13a, factors including, for example, a value of a current that flows in the motor generator 4 and a voltage value thereof and signals supplied from various sensors. The power control unit 13 may convert a direct-current electric power supplied from a battery (BATT) 7 into an alternating-current electric power by controlling the inverter 13a, and may thereby drive the motor generator 4.

The power control unit 13 may cause the motor generator 4 to function as an electrical generator by controlling the inverter 13a upon deceleration traveling, and may convert an alternating-current electric power generated by the motor generator 4 on the basis of the regenerative brake into a direct-current electric power to thereby charge the battery 7. Causing the motor generator 4 to function as the electrical generator may apply a regenerative braking force based on the regenerative brake to the wheels 5. It should be noted that the regenerative braking force may be applied to drive wheels, and that the regenerative braking force, or the regenerative brake torque, may be applied to all of the wheels 5 in an example embodiment where the vehicle 1 is the four-wheel drive.

The brake control unit 14 may receive control data from the hybrid control unit 10, and may receive detection data supplied from various sensors including, for example, wheel speed sensors 17fl, 17fr, 17r1, and 17rr (hereinafter collectively referred to as "wheel speed sensors 17") that detect wheel speeds of the respective wheels 5 and a longitudinal acceleration sensor 18. The brake control unit 14 may control driving of the wheel cylinders 8 by performing a brake fluid pressure control on a brake actuator (B/A) 6 on the basis of the received pieces of data, and may thereby generate a friction braking force, or the friction brake torque, at the wheels 5.

Figure 2:
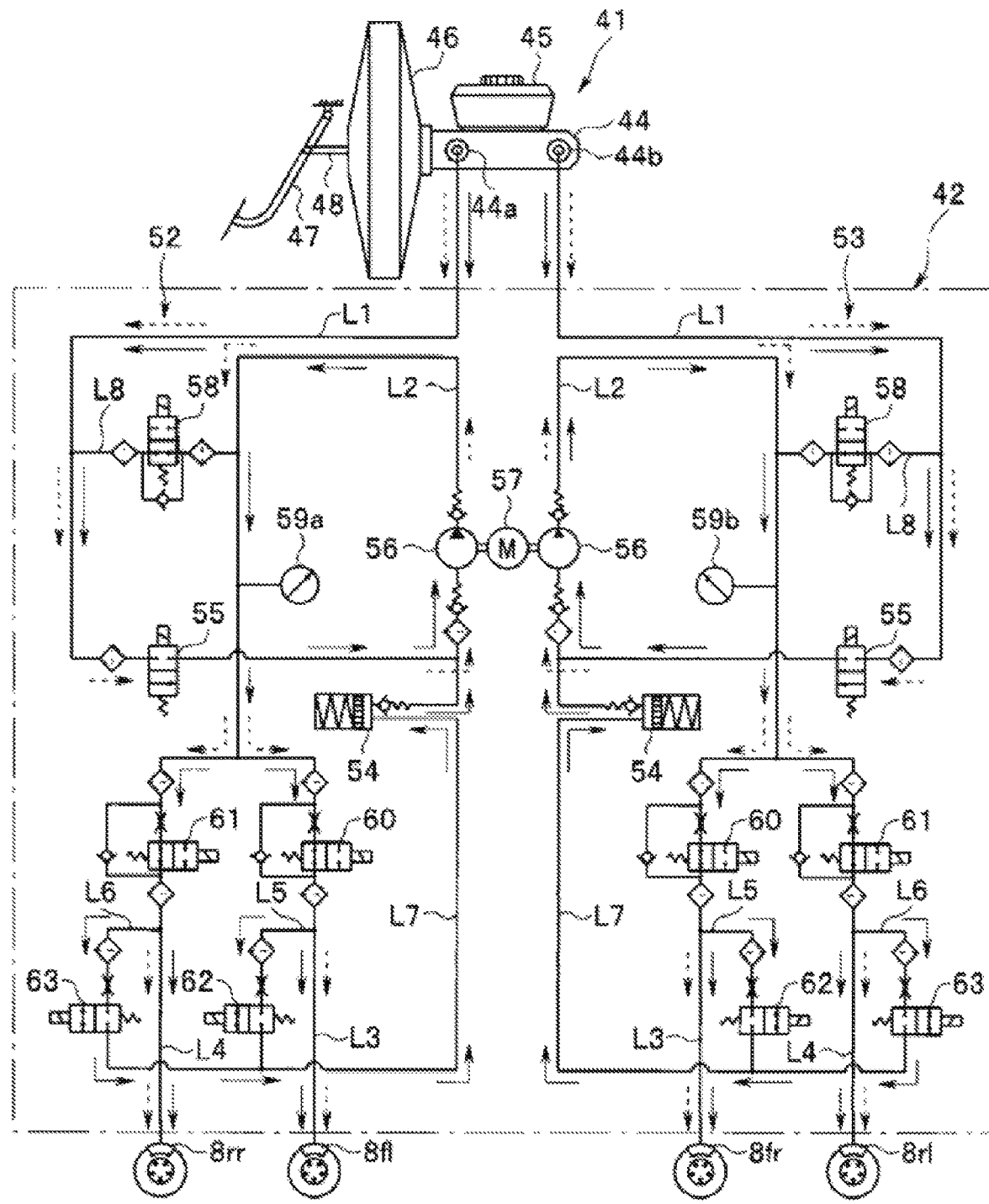
FIG. 2 is a diagram illustrating an example of a configuration of a brake actuator.

Referring to FIG. 2, for example, the brake actuator 6 may include a brake fluid pressure circuit 42 coupled to a brake fluid pressure generator 41.

The brake fluid pressure generator 41 may include: a master cylinder 44; a reservoir tank 45 attached to the master cylinder 44; and a brake booster 46 provided between the brake pedal 16a and the master cylinder 44. The reservoir tank 45 may contain a pressuring medium such as an oil. The brake pedal 16a may be coupled to the brake booster 46 via an operating rod 48.

The master cylinder 44 of the brake fluid pressure generator 41 may be coupled, via the brake fluid pressure circuit 42, to the wheel cylinders 8fl, 8fr, 8r1, and 8rr that are provided at the respective left front wheel 5fl, right front wheel 5fr, left rear wheel 5r1, and right rear wheel 5rr of the vehicle 1.

The brake fluid pressure circuit 42 may have two fluid pressure lines including a first fluid pressure circuit 52 and a second fluid pressure circuit 53. In an example embodiment, the brake fluid pressure circuit 42 may be of a cross piping type, or an X-piping type in which the first fluid pressure circuit 52 and the second fluid pressure circuit 53 are so installed as to intersect in diagonal directions of the vehicle 1. For example, the first fluid pressure circuit 52 of the brake fluid pressure circuit 42 in an example embodiment may be coupled to the wheel cylinders 8fl and 8rr of the left front wheel 5fl and the right rear wheel 5rr disposed in one of the diagonal directions of the vehicle 1. For example, the second fluid pressure circuit 53 of the brake fluid pressure circuit 42 in an example embodiment may be coupled to the wheel cylinders 8fr and 8r1 of the right front wheel 5fr and the left rear wheel 5r1 disposed in the other of the diagonal directions of the vehicle 1.

It should be noted that the first fluid pressure circuit 52 and the second fluid pressure circuit 53 have the same configuration as each other, and that elements having substantially the same function and configuration are denoted with the same reference numerals in the following as appropriate to simplify the description. Further, for convenience of description, the description is given by referring to a side on which the master cylinder 44 is provided as an upstream side and a side on which the wheel cylinders 8fl, 8fr, 8r1, and 8rr are provided as a downstream side, on the basis of a flow from the master cylinder 44 to the side on which the wheel cylinders 8fl, 8fr, 8r1, and 8rr of brake calipers are provided.

The master cylinder 44 may be provided with first and second feed/discharge ports 44a and 44b. The first and the second feed/discharge ports 44a and 44b may be coupled to the respective upstream sides of first fluid paths L1 configuring the respective first and second fluid pressure circuits 52 and 53. The downstream side of the first fluid path L1 may be coupled to a mid-stream part of the second fluid path L2. The upstream side of the second fluid path L2 may be coupled to a low-pressure accumulator 54. In one embodiment, the low-pressure accumulator 54 may serve as a "pressure-accumulating device".

The downstream side of the second fluid path L2 may be so branched as to be coupled to a third fluid path L3 and a fourth fluid path L4. The downstream side of the third fluid path L3 or the fourth fluid path L4 may be coupled to the wheel cylinders 8fl and 8rr (or 8fr and 8r1). The wheel cylinders 8fl and 8rr (or 8fr and 8r1) may operate the brake calipers provided at the respective wheels 5fl and 5rr (or 5fr and 5r1) to thereby generate a braking force, i.e., the friction braking force, at the respective wheels 5fl and 5rr (or 5fr and 5r1).

The mid-stream parts of the respective third and fourth fluid paths L3 and L4 may be coupled to the upstream sides of fifth and sixth fluid paths L5 and L6. The downstream sides of the respective fifth and sixth fluid paths L5 and L6 may be coupled to respective seventh fluid paths L7. The downstream side of the seventh fluid path L7 may be coupled to the low-pressure accumulator 54.

The first fluid path L1 may be provided with a gate-in valve 55. A fluid pressure pump 56 is provided at the second fluid path L2 at a location downstream of the first fluid path L1. The fluid pressure pumps 56 of the respective first and second fluid pressure circuits 52 and 53 may be coupled to a common electric motor 57.

The fluid pressure pumps 56 may have their respective drive shafts that are so coupled to the electric motor 57 that the pulsations of fluid pressures to be generated by the respective fluid pressure pumps 56 have opposite phases to each other. The electric motor 57 may be driven and controlled on the basis of a control signal, or a brake fluid pressure indication value, to be supplied from the brake control unit 14. The electric motor 57 may be basically driven at a high speed upon braking during high-speed traveling where the large braking force, or a large brake fluid pressure, is necessary. The electric motor 57 may be basically driven at a low speed upon braking during low-speed traveling where the large braking force, or the large brake fluid pressure, is not so necessary.

The first fluid path L1 on the upstream side of the gate-in valve 55 and the second fluid path L2 on the downstream side of the fluid pressure pump 56 may be bypass coupled via an eighth fluid path L8. The eighth fluid path L8 may be provided with a bypass valve 58. The first brake fluid pressure sensor 59a (or the second brake fluid pressure sensor 59b) may be provided at the second fluid path L2 at a location downstream of the eighth fluid path L8. The first brake fluid pressure sensor 59a (or the second brake fluid pressure sensor 59b) may detect a fluid pressure of a brake fluid that acts on the second fluid path L2, for example. The third and the fourth fluid paths L3 and L4 may be provided with respective pressuring valves 60 and 61. The fifth and the sixth fluid paths L5 and L6 may be provided with respective decompression valves 62 and 63.

The gate-in valve 55, the bypass valve 58, the pressuring valves 60 and 61, and the decompression valves 62 and 63 each may be, for example, an electromagnetic solenoid valve, and may be switched in response to a drive signal supplied from the brake control unit 14. In an example embodiment, the bypass valve 58 and the pressuring valves 60 and 61 each may be a normally-open electromagnetic solenoid valve, and the gate-in valve 55 and the decompression valves 62 and 63 each may be a normally-closed electromagnetic solenoid valve, for example.

The brake control unit 14 may perform various braking control on the brake actuator 6 by controlling devices including, for example, the electric motor 57 and each of the gate-in valve 55, the bypass valve 58, the pressuring valves 60 and 61, and the decompression valves 62 and 63.

For example, the brake control unit 14 may basically stop the electric motor 57, close the gate-in valve 55, and open the bypass valve 58. Thus, the brake fluid pressure generated by the master cylinder 44 in response to an amount of pressing performed on the brake pedal 16a by the driver may be fed as it is to each of the wheel cylinders 8.

The brake control unit 14 may drive the electric motor 57 when the target deceleration rate for a control such as the automatic brake control is set by the driving assist device, in a case where the vehicle 1 is mounted with the unillustrated driving assist device. Further, the brake control unit 14 may open the gate-in valve 55 and close the bypass valve 58. Thus, the pressuring medium pressurized by the master cylinder 44 or the pressuring medium fed as it is from the reservoir tank 45 may be pressurized to a predetermined brake fluid pressure as a result of traveling through the fluid pressure pump 56, following which the thus-pressurized pressuring medium may be fed to from the second fluid path L2 to the third and the fourth fluid paths L3 and L4.

The brake control unit 14 may drive and control the pressuring valves 60 and 61 and the decompression valves 62 and 63 to perform a distribution control and a depressurizing control of the brake fluid pressure to be supplied to each of the wheel cylinders 8, thereby achieving controls including, for example, an anti-lock brake system (ABS) and an antiskid brake control.

The brake control unit 14 may decrease the brake fluid pressure by driving and controlling devices including, for example, the decompression valves 62 and 63 and the electric motor 57, upon the braking force control that causes the friction brake to operate in cooperation with a brake such as the regenerative brake or the engine brake. Thus, the friction braking force may be control to a braking force corresponding to a torque distribution value of the necessary brake torque calculated by the hybrid control unit 10.

In an example embodiment, the brake control unit 14 performs a braking force compensation that utilizes the friction brake until the regenerative brake is disconnected from the braking force control by the power control unit 13 in a case where an abnormality occurs in the regenerative brake, upon the braking force control that causes the engine brake, the regenerative brake, and the friction brake to operate in cooperation with each other.

For example, the brake control unit 14 may perform a first braking force compensation control in a case where an abnormality is detected only for the regenerative brake, or in a case where: the abnormality is detected for the regenerative brake; and an abnormality is detected for a control system of the power unit PU. Upon the first braking force compensation control, the brake control unit 14 may compensate for the braking force by setting, as the target deceleration rate, an acceleration rate that is at the time when the abnormality of the regenerative brake is detected (in some embodiments, at the time immediately prior to the detection of the abnormality of the regenerative brake) and by performing a feedback control that utilizes the friction brake on the thus-set target deceleration rate.

The abnormality of the regenerative brake may refer to, for example, a case where the regenerative brake is cutoff, or in a case where the braking force based on the regenerative brake is no longer generated. The abnormality of the regenerative brake may be determined, for example, by the power control unit 13. For example, the power control unit 13 may determine the abnormality of the regenerative brake in a case where a predetermined regenerative electric power generation is not achieved by the motor generator 4 even through the regenerative brake control is carried out.

The abnormality of the control system of the power unit PU may refer to, for example, a case where an abnormality of a sensor system of the power unit PU or an abnormality of an actuator system is detected on the basis of a known abnormality diagnosis performed by a device such as the engine control unit 11 or the transmission control unit 12.

In some embodiments, the brake control unit 14 may perform a second braking force compensation control at least in a case where: an abnormality is detected for the regenerative brake; and an abnormality of a sensor is detected for a braking system. Upon the second braking force compensation control, the brake control unit 14 may compensate for the braking force by means of the braking force that is based on a preset brake fluid pressure. The case where the abnormality is detected for the regenerative brake and where the abnormality of the sensor is detected for the braking system may encompass, for example, a case where: the abnormality is detected for the regenerative brake; the abnormality is detected for the control system of the power unit PU; and the abnormality of the sensor is detected for the braking system.

The abnormality of the sensor of the braking system may refer to, for example, a case where a sensor value is not outputted or an abnormal sensor value is outputted by a device such as each wheel sensor 17 or the longitudinal acceleration sensor 18, on the basis of a known abnormality diagnosis performed by a device such as the brake control unit 14.

In one embodiment, the hybrid control unit 10 may serve, together with the engine control unit 11, the transmission control unit 12, the power control unit 13, and the brake control unit 14, as a "braking force control unit". In one embodiment, devices including, for example, the engine control unit 11 and the transmission control unit 12 may serve as a "power unit abnormality detecting unit" or a "third abnormality detecting unit". In one embodiment, the power control unit 13 may serve as a "regenerative brake abnormality detecting unit" or a "first abnormality detecting unit". In one embodiment, the power control unit 13 may serve as a "regenerative brake stopping unit". In one embodiment, the brake control unit 14 may serve as a "braking force compensating unit". In one embodiment, the brake control unit 14 may serve as a "braking system sensor abnormality detecting unit" or a "second abnormality detecting unit".

Figure 3:
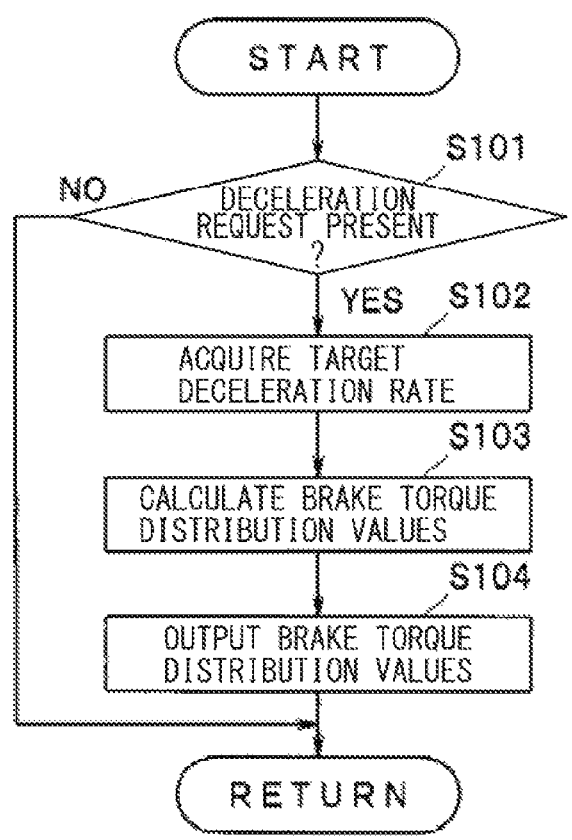
FIG. 3 is a flowchart illustrating an example of a routine of a brake torque distribution control.

Next, a description is given, with reference to FIG. 3, of a brake torque distribution control to be performed on each brake, i.e., the regenerative brake, the engine brake, and the friction brake. FIG. 3 is a flowchart illustrating an example of a routine of the brake torque distribution control. The hybrid control unit 10 may repeatedly execute the routine of the brake torque distribution control for each set time.

After the start of the routine, in step S101, the hybrid control unit 10 may determine whether a deceleration request is made. For example, the hybrid control unit 10 may determine that the deceleration request that is based on the coast traveling is made, in a case where a released state of the accelerator pedal 15*a* is detected on the basis of a signal supplied from the accelerator sensor 15. Alternatively, for example, the hybrid control unit 10 may determine that the deceleration request is made, in a case where a pressing state of the brake pedal 16*a* is detected on the basis of a signal supplied from the brake sensor 16. Alternatively, for example, the hybrid control unit 10 may determine that the deceleration request is made, in a case where the target deceleration rate is supplied from the unillustrated driving assist device.

If the hybrid control unit 10 determines in step S101 that the deceleration request is not made (step S101: NO), the hybrid control unit 10 may end the routine.

The routine may proceed to step S102 from step S101. In step S102, the hybrid control unit 10 may acquire the target deceleration rate. For example, upon the coast traveling, the hybrid control unit 10 may calculate the target deceleration rate on the basis of a factor such as a signal (e.g., the accelerator position) supplied from the accelerator sensor 15 or a vehicle speed. The hybrid control unit 10 may calculate the target deceleration rate on the basis of signals received from devices including, for example, the first and the second brake fluid pressure sensors 59*a* and 59*b*, in a case where pressing of the brake pedal 16*a* performed by the driver is detected on the basis of a signal supplied from the brake sensor 16. The hybrid control unit 10 may acquire the target acceleration rate to be used for, for example, the automatic brake control calculated by the unillustrated driving assist device, in a case where the vehicle 1 is mounted with the driving assist device.

Thereafter, in step S103, the hybrid control unit 10 may calculate the necessary brake torque on the basis of the current target deceleration rate. Further, the hybrid control unit 10 may calculate the respective brake torque distribution values to be used to distribute the calculated necessary brake torque to the regenerative brake, the engine brake, and the friction brake on the basis of a factor such as a traveling state of the vehicle 1.

The routine may proceed to step S104 from step S103. In step S104, the hybrid control unit 10 may output, as the control data, the calculated brake torque distribution values to the respective corresponding control units, following which the hybrid control unit 10 may end the routine.

For example, in a case where the brake toque distribution value for the regenerative brake is calculated, the hybrid control unit 10 may output, as the control data, the calculated brake toque distribution value to the power control unit 13. Thus, a control such as a magnetic field control for the regenerative electric power generation may be performed on the motor generator 4, and the regenerative braking force corresponding to the brake torque distribution value may be generated accordingly. It should be noted that the regenerative brake may be prohibited in a case where a later-described regenerative brake prohibition flag F is set to "1". Accordingly, the regenerative brake may be excluded from a target of the calculation of the brake torque distribution values in step S103 described above, in a case where the regenerative brake prohibition flag F is set to "1".

Further, for example, in a case where the brake toque distribution value for the engine brake is calculated, the hybrid control unit 10 may output, as the control data, the calculated brake toque distribution value to the engine control unit 11 and the transmission control unit 12. Thus, an output torque of the engine 2 and the gear ratio of the automatic transmission 3 may be controlled, and the engine braking force corresponding to the brake torque distribution value may be generated accordingly.

Further, for example, in a case where the brake toque distribution value for the friction brake is calculated, the hybrid control unit 10 may output, as the control data, the calculated brake toque distribution value to the brake control unit 14. Thus, the brake fluid pressure control may be performed on the brake actuator 6, and the friction braking force corresponding to the brake torque distribution value may be generated accordingly.

Figure 4:
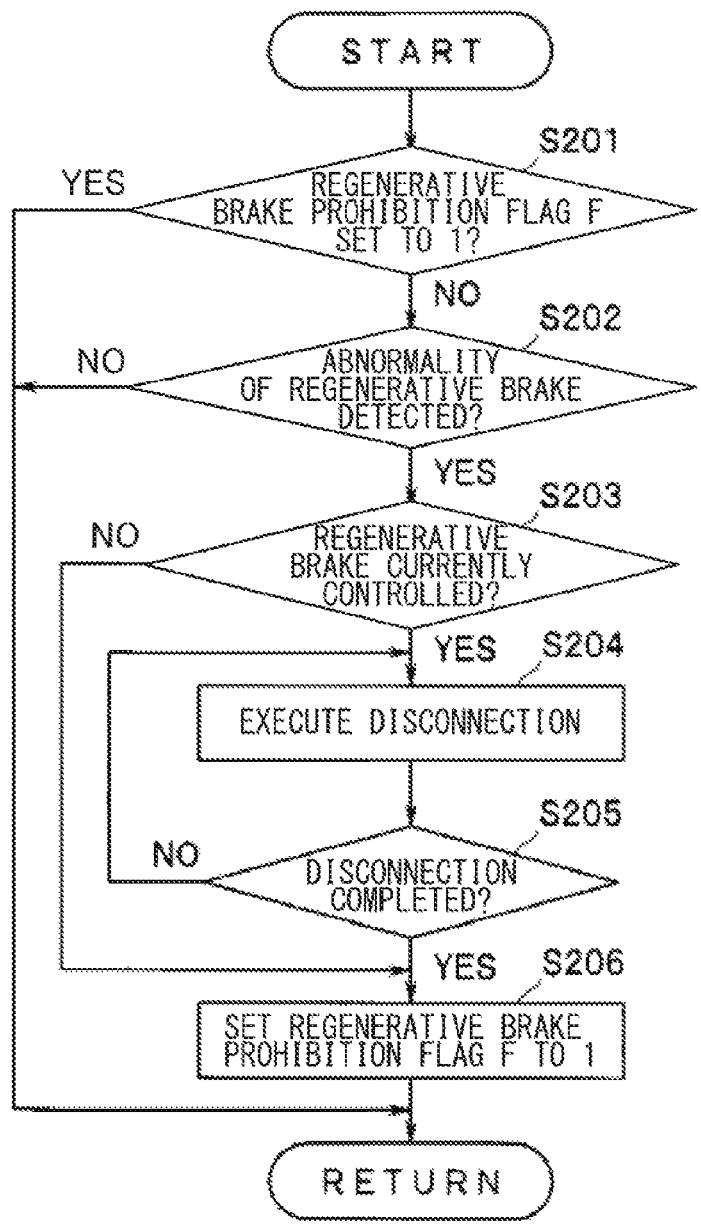
FIG. 4 is a flowchart illustrating an example of a routine of a regenerative brake disconnection control.

Next, a description is given, with reference to FIG. 4, of a regenerative brake disconnection control upon an abnormality of the regenerative brake. FIG. 4 is a flowchart illustrating an example of a routine of the regenerative brake disconnection control. The regenerative brake disconnection control may disconnect the regenerative brake from the braking control in a case where an abnormality of the regenerative brake is detected upon the above-described braking control, i.e., the brake torque distribution control. The power control unit 13 may repeatedly execute the routine of the regenerative brake disconnection control for each set time.

After the start of the routine, in step S201, the power control unit 13 may determine whether the regenerative brake prohibition flag F is set to "1". If the power control unit 13 determines in step S201 that the regenerative brake prohibition flag F is set to "1" (step S201: YES), the power control unit 13 may end the routine.

If the power control unit 13 determines in step S201 that the regenerative brake prohibition flag F is cleared and set to "0" (step S201: NO), the routine may proceed to step S202. In step S202, the power control unit 13 may determine whether an abnormality of the regenerative brake is detected.

If the power control unit 13 determines in step S202 that the abnormality of the regenerative brake is not detected (step S202: NO), the power control unit 13 may end the routine.

If the power control unit 13 determines in step S202 that the abnormality of the regenerative brake is detected (step S202: YES), the routine may proceed to step S203. In step S203, the power control unit 13 may determine whether the regenerative brake is currently controlled.

If the power control unit 13 determines in step S203 that the regenerative brake is not currently controlled (step S203: NO), the routine may proceed to step S206.

If the power control unit 13 determines in step S203 that the regenerative brake is currently controlled (step S203: YES), the routine may proceed to step S204. In step S204, the power control unit 13 may execute the disconnection of the regenerative brake from the braking force control. For example, the power control unit 13 may cancel the magnetic field control for the regenerative electric power generation performed on the motor generator 4, and may release the coupling of the output shaft of the automatic transmission 3 to the motor generator 4 by controlling the unillustrated clutches.

The routine may proceed to step S205 from step S204. In step S205, the power control unit 13 may determine whether the disconnection of the regenerative brake is completed.

If the power control unit 13 determines in step S205 that the disconnection of the regenerative brake is not completed (step S205: NO), the routine may return to step S204.

If the power control unit 13 determines in step S205 that the disconnection of the regenerative brake is completed (step S205: YES), the routine may proceed to step S206.

The routine may proceed to step S206 from step S203 or from step S205. In step S206, the power control unit 13 may set the regenerative brake prohibition flag F that prohibits the regenerative brake to "1". Thereafter, the power control unit 13 may end the routine.

Figure 5:
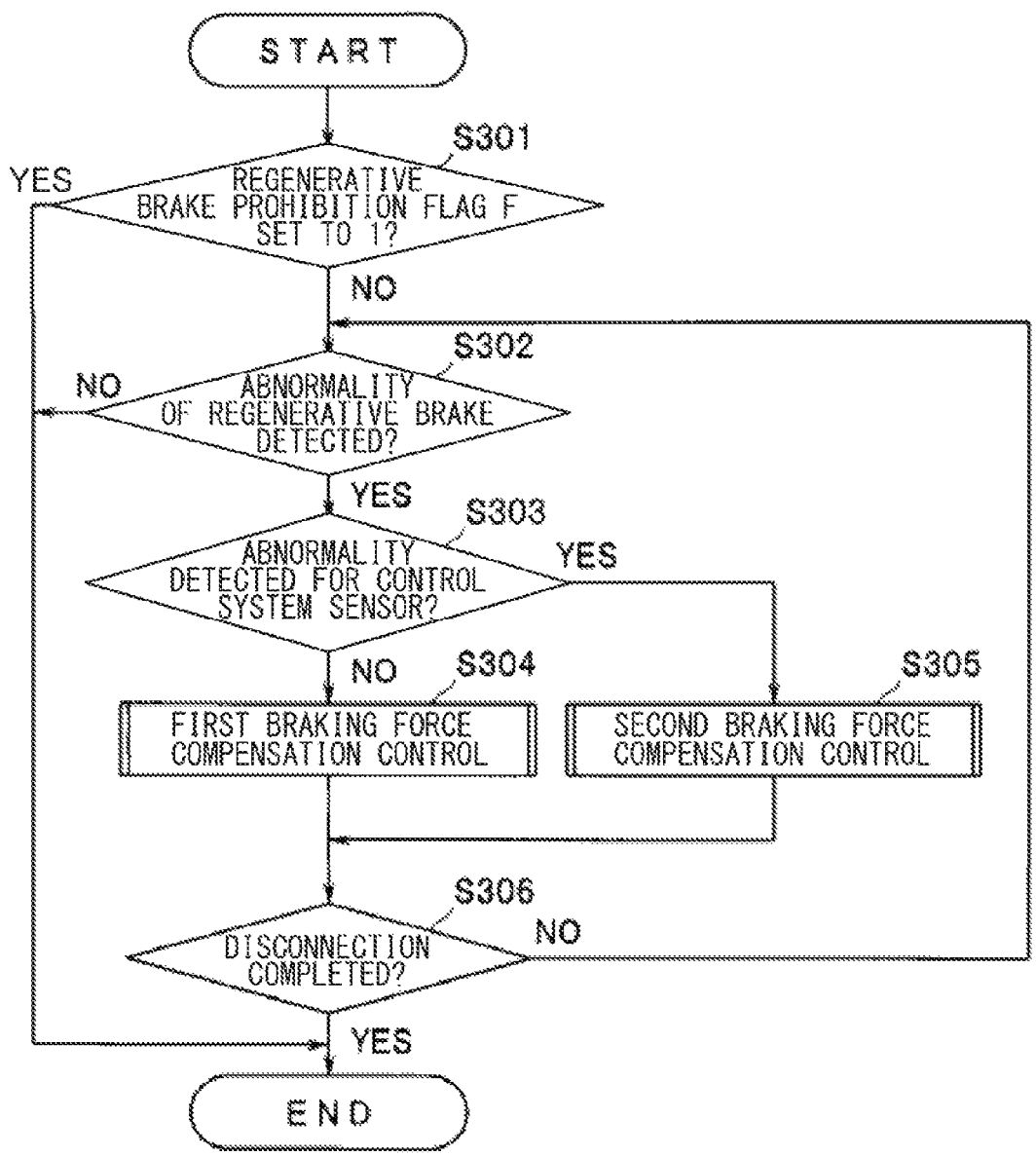
FIG. 5 is a flowchart illustrating an example of a routine of a braking force compensation control upon an abnormality of a regenerative brake.

Next, a description is given, with reference to FIG. 5, of the braking force compensation control upon an abnormality of the regenerative brake. FIG. 5 is a flowchart illustrating an example of a routine of the braking force compensation control upon the abnormality of the regenerative brake. The brake control unit 14 may repeatedly execute the routine of the braking force compensation control for each set time.

After the start of the routine, in step S301, the brake control unit 14 may determine whether the regenerative brake prohibition flag F is set to "1".

If the brake control unit 14 determines in step S301 that the regenerative brake prohibition flag F is set to "1" (step S301: YES), the brake control unit 14 may end the routine.

If the brake control unit 14 determines in step S301 that the regenerative brake prohibition flag F is cleared and set to "0" (step S301: NO), the routine may proceed to step S302. In step S302, the brake control unit 14 may determine whether an abnormality of the regenerative brake is detected by the power control unit 13.

If the brake control unit 14 determines in step S302 that the abnormality of the regenerative brake is not detected (step S302: NO), the brake control unit 14 may end the routine.

If the brake control unit 14 determines in step S302 that the abnormality of the regenerative brake is detected (step S302: YES), the routine may proceed to step S303. In step S303, the brake control unit 14 may determine whether an abnormality is detected for a sensor of a control system.

If the brake control unit 14 determines in step S303 that the abnormality is detected for the sensor of the control system (step S303: YES), the routine may proceed to step S305.

If the brake control unit 14 determines in step S303 that the abnormality is not detected for the sensor of the control system (step S303: NO), the routine may proceed to step S304. In step S304, the brake control unit 14 may execute the first braking force compensation control.

Figure 6:
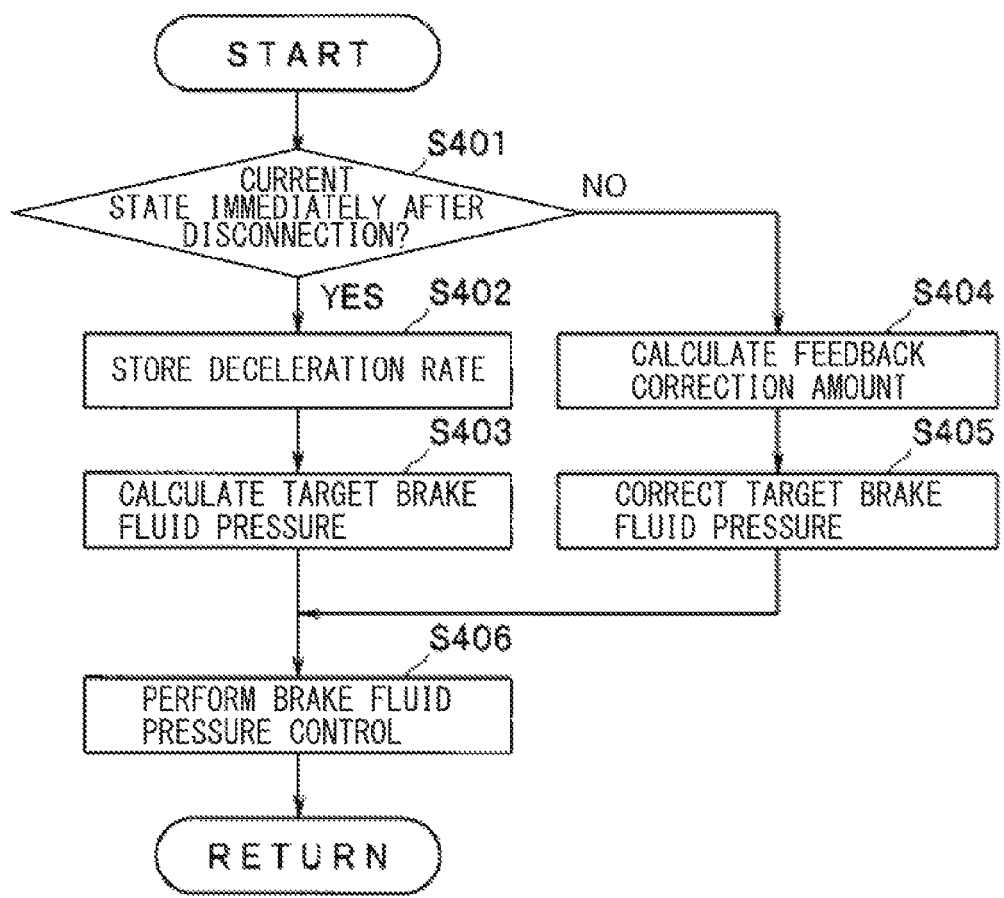
FIG. 6 is a flowchart illustrating an example of a subroutine of a first braking force compensation control.

The brake control unit 14 may execute the first braking force compensation control on the basis of a subroutine of the first braking force compensation control illustrated by way of example in FIG. 6. FIG. 6 is a flowchart illustrating an example of the subroutine of the first braking force compensation control.

After the start of the subroutine, in step S401, the brake control unit 14 may determine whether the current state is immediately after the disconnection of the regenerative brake due to the abnormality.

If the brake control unit 14 determines in step S401 that the current state is not immediately after the disconnection of the regenerative brake (step S401: NO), the routine may proceed to step S404.

If the brake control unit 14 determines in step S401 that the current state is immediately after the disconnection of the regenerative brake (step S401: YES), the routine may proceed to step S402. In step S402, the brake control unit 14 may store, as the target deceleration rate, a deceleration rate that is at the time of the generation of the abnormality of the regenerative brake. For example, the brake control unit 14 may store, as the target deceleration rate, the deceleration rate that is at the time immediately before the disconnection of the regenerative brake.

Thereafter, in step S403, the brake control unit 14 may calculate the target brake fluid pressure. For example, the brake control unit 14 may calculate, as the target brake fluid pressure, the brake fluid pressure that is necessary for generating the target deceleration rate by the friction brake, on the basis of the target deceleration rate and a current deceleration rate of the vehicle 1. For example, the current deceleration rate of the vehicle 1 may be a deceleration rate detected by the longitudinal acceleration sensor 18. Thereafter, the routine may proceed to step S406.

The routine may proceed to step S404 from step S401. In step S404, the brake control unit 14 may calculate a feedback correction amount for a correction of the target brake fluid pressure, on the basis of the target deceleration rate set in step S402 and the current deceleration rate of the vehicle 1. For example, the current deceleration rate of the vehicle 1 may be the deceleration rate detected by the longitudinal acceleration sensor 18.

Thereafter, in step S405, the brake control unit 14 may correct the target brake fluid pressure on the basis of the feedback correction amount. Thereafter, the routine may proceed to step S406.

The routine may proceed to step S406 from step S403 or from step S405. In step S406, the brake control unit 14 may perform the brake fluid pressure control on the brake actuator 6 by means of the target brake fluid pressure. Thereafter, the brake control unit 14 may end the routine.

The routine may proceed to step S305 from step S303 of the main routine illustrated in FIG. 5. In step S305, the brake control unit 14 may execute the second braking force compensation control, following which the routine may proceed to step S306.

Figure 7:
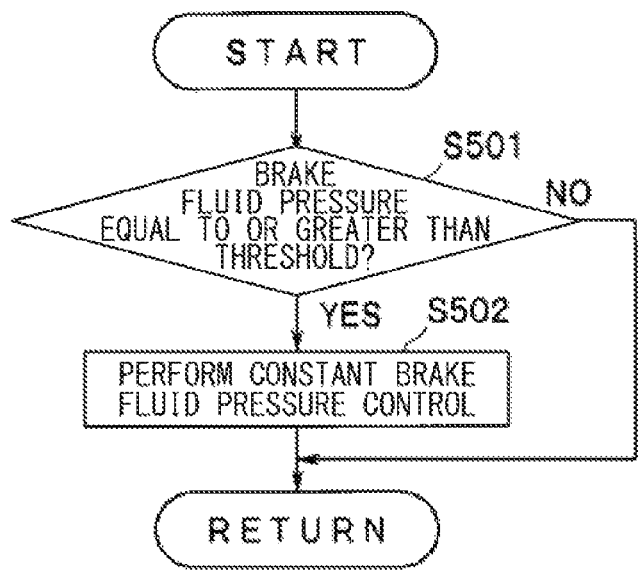
FIG. 7 is a flowchart illustrating an example of a subroutine of a second braking force compensation control.

The brake control unit 14 may execute the second braking force compensation control on the basis of a subroutine of the second braking force compensation control illustrated by way of example in FIG. 7. FIG. 7 is a flowchart illustrating an example of the subroutine of the second braking force compensation control.

After the start of the subroutine, in step S501, the brake control unit 14 may determine whether the brake fluid pressure that is at the time of the generation of the abnormality of the regenerative brake is equal to or greater than a preset threshold. For example, the brake control unit 14 may determine whether the brake fluid pressure that is at the time immediately before the disconnection of the regenerative brake is equal to or greater than the preset threshold.

If the brake control unit 14 determines in step S501 that the brake fluid pressure at the time of the generation of the abnormality of the regenerative brake is less than the threshold (step S501: NO), the brake control unit 14 may end the routine.

If the brake control unit 14 determines in step S501 that the brake fluid pressure at the time of the generation of the abnormality of the regenerative brake is equal to or greater than the threshold (step S501: YES), the routine may proceed to step S502. In step S502, the brake control unit 14 may perform the brake fluid pressure control on the brake actuator 6 by means of a preset constant brake fluid pressure. Thereafter, the brake control unit 14 may end the routine.

The routine may proceed to step S306 from step S304 or from step S305 of the main routine illustrated in FIG. 5. In step S306, the brake control unit 14 may determine whether the disconnection of the regenerative brake from the braking force control is completed.

If the brake control unit 14 determines in step S306 that the disconnection of the regenerative brake is not completed (step S306: NO), the routine may return to step S302.

If the brake control unit 14 determines in step S306 that the disconnection of the regenerative brake is completed (step S306: YES), the brake control unit 14 may end the routine.

In an example embodiment described above, the brake control unit 14 sets, as the target deceleration rate, the deceleration rate that is at the time when the abnormality of the regenerative brake is detected and performs the braking force compensation that is based on the friction brake by performing the feedback control on the target deceleration rate in a case where the abnormality of the regenerative brake is detected, upon the braking force control that causes the engine brake, the regenerative brake, and the friction brake to operate in cooperation with each other. This helps to perform appropriate braking even in a case where complex abnormalities are occurred upon the braking control.

For example, the brake control unit 14 may perform the braking force compensation that is based on the feedback control that utilizes only sensor data acquirable by the brake control unit 14, even in a case where an abnormality occurs in the regenerative brake, or even in a case where the abnormality occurs in the regenerative brake and where it is not possible to use the control data of the control system of the power unit PU for the braking control. Thus, it helps to prevent a temporal decrease in the braking force of the vehicle 1 as a whole until the regenerative brake is disconnected from the braking force control. Hence, it helps to accurately prevent, for example, an increase in a braking distance and to secure a safety. In addition, the feedback control is performed on the deceleration rate that is at the time when the abnormality of the regenerative brake is detected until the regenerative brake is disconnected from the braking force control, which also helps to prevent a sense of discomfort to be given to an occupant due to a rapid increase in the deceleration rate.

In some embodiments, the brake control unit 14 may perform the braking force compensation control that is based on the preset constant brake fluid pressure in place of the braking force compensation that is based on the feedback control, at least in a case where: an abnormality of the regenerative brake is detected; and an abnormality of a sensor of the braking system is detected. Thus, it helps to perform the braking force compensation even for further complex abnormalities.

In some embodiments, the brake control unit 14 may refrain from performing the braking force compensation that is based on the constant brake fluid pressure, in a case where the brake fluid pressure that is at the time when the abnormality of the regenerative brake is detected is less than the preset threshold. Thus, it helps to prevent the generation of excessive braking force.

In some embodiments, one or more of the devices including the hybrid control unit 10, the engine control unit 11, the transmission control unit 12, the power control unit 13, and the brake control unit 14 may include a known microprocessor and its peripheral devices. The microprocessor may have devices including, for example, a central processing unit (CPU), a random-access memory (RAM), a read-only memory (ROM), and a rewritable non-volatile storage. The ROM may contain, in advance, a program to be executed by the CPU and fixed data such as a data table, for example. All or a part of functions of the processor may be achieved by a logic circuit or an analog circuit, and processes based on various programs may be achieved by an electronic circuit such as field programmable gate array (FPGA).

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in a case where it is possible to solve a problem mentioned above and any of effects mentioned above is achievable even if at least one element is removed from all of the elements described in at least one embodiment described above, a configuration in which the at least one element is removed may be extracted as one embodiment of the technology.

One or more of the hybrid control unit 10, the engine control unit 11, the transmission control unit 12, the power control unit 13, and the brake control unit 14 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more of the hybrid control unit 10, the engine control unit 11, the transmission control unit 12, the power control unit 13, and the brake control unit 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more of the hybrid control unit 10, the engine control unit 11, the transmission control unit 12, the power control unit 13, and the brake control unit 14 illustrated in FIG. 1.

The invention claimed is:

1. A braking control apparatus for a hybrid vehicle, the hybrid vehicle including a power unit that has an engine and a motor generator, the engine and the motor generator serving as drive sources of the power unit, the braking control apparatus comprising:

a braking force control unit configured to perform a braking force control by coordinating an engine brake using the engine, a regenerative brake using the motor generator, and a friction brake using a friction engagement member;
a first abnormality detecting unit configured to detect an abnormality in the regenerative brake;
a second abnormality detecting unit configured to detect an abnormality in (1) a wheel speed sensor of the hybrid vehicle or (2) a longitudinal acceleration sensor of the hybrid vehicle;
a regenerative brake stopping unit configured to disconnect the regenerative brake from the braking force control and stop an activation of the regenerative brake, in a case where the abnormality in the regenerative brake is detected by the first abnormality detecting unit; and
a braking force compensating unit configured to perform a braking force compensation that utilizes the friction brake, during a time period from when the abnormality in the regenerative brake is detected by the first abnormality detecting unit to when the regenerative brake is disconnected from the braking force control by the regenerative brake stopping unit,
wherein the braking force compensating unit is configured to perform the braking force compensation by performing a feedback control based on a deceleration rate at a time when the abnormality in the regenerative brake is detected by the first abnormality detecting unit, and
wherein the braking force compensating unit is configured to perform the braking force compensation by applying a preset constant brake fluid pressure to the friction brake, in place of performing the feedback control, at least in a case where: the abnormality in the regenerative brake is detected by the first abnormality detecting unit; and the abnormality in the wheel speed sensor or the longitudinal acceleration sensor is detected by the second abnormality detecting unit.

2. The braking control apparatus for the hybrid vehicle according to claim 1, further comprising a third abnormality detecting unit configured to detect an abnormality in a control system of the power unit, wherein
the braking force compensating unit is configured to refrain from performing the braking force compensation using the constant brake fluid pressure, in a case where a brake fluid pressure at a time when the abnormality in the regenerative brake detected by the first abnormality detecting unit is less than a threshold, even in a case where: the abnormality in the regenerative brake is detected by the first abnormality detecting unit; the abnormality in the wheel speed sensor or the longitudinal acceleration sensor is detected by the second abnormality detecting unit; and the abnormality in the control system of the power unit is detected by the third abnormality detecting unit.

3. A braking control apparatus for a hybrid vehicle, the hybrid vehicle including a power unit that has an engine and a motor generator, the engine and the motor generator serving as drive sources of the power unit, the braking control apparatus comprising
circuitry configured to:
perform a braking force control by coordinating an engine brake using the engine, a regenerative brake using the motor generator, and a friction brake using a friction engagement member;
detect an abnormality in the regenerative brake;
detect an abnormality in (1) a wheel speed sensor of the hybrid vehicle or (2) a longitudinal acceleration sensor of the hybrid vehicle;
disconnect the regenerative brake from the braking force control and stop an activation of the regenerative brake, in a case where the abnormality in the regenerative brake is detected; and
perform a braking force compensation that utilizes the friction brake, during a time period from when the abnormality in the regenerative brake is detected to when the regenerative brake is disconnected from the braking force control,
wherein the circuitry is configured to perform the braking force compensation by performing a feedback control based on a deceleration rate at a time when the abnormality in the regenerative brake is detected, and
wherein the circuitry is configured to perform the braking force compensation by applying a preset constant brake fluid pressure to the friction brake, in place of performing the feedback control, at least in a case where: the abnormality in the regenerative brake is detected by the circuitry; and the abnormality in the wheel speed sensor or the longitudinal acceleration sensor is detected by the circuitry.

4. The braking control apparatus for the hybrid vehicle according to claim 3, wherein the circuitry is configured to:
detect an abnormality in a control system of the power unit; and
refrain from performing the braking force compensation using the constant brake fluid pressure, in a case where a brake fluid pressure at a time when the abnormality in the regenerative brake detected by the circuitry is less than a threshold, even in a case where: the abnormality in the regenerative brake is detected by the circuitry, wherein the abnormality in the wheel speed sensor or the longitudinal acceleration sensor is detected by the circuitry; and the abnormality in the control system of the power unit is detected by the circuitry.

* * * * *